US007688328B2

(12) United States Patent
Chen et al.

(10) Patent No.: US 7,688,328 B2
(45) **Date of Patent: *Mar. 30, 2010**

(54) LUMINANCE POINT CORRECTION WITHOUT LUMINANCE DEGRADATION

(75) Inventors: Kok Chen, Sunnyvale, CA (US); Gabriel G. Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/265,882

(22) Filed: Nov. 2, 2005

(65) Prior Publication Data

US 2006/0050080 A1 Mar. 9, 2006

Related U.S. Application Data

(63) Continuation of application No. 10/641,214, filed on Aug. 13, 2003, now Pat. No. 6,972,772.

(51) Int. Cl.

| | |
|---|---|
| ***G09G 5/02*** | (2006.01) |
| ***G09G 3/36*** | (2006.01) |
| ***H04N 5/202*** | (2006.01) |
| ***H04N 5/14*** | (2006.01) |
| ***G06K 9/00*** | (2006.01) |

(52) U.S. Cl. ......................... 345/589; 345/89; 345/600; 348/254; 348/671; 382/167

(58) Field of Classification Search ................ 345/589, 345/593, 600, 87–89; 348/254, 519, 671–674, 348/687–690, 177, 179; 382/167
See application file for complete search history.

(56) References Cited

U.S. PATENT DOCUMENTS 6,686,953 B1 * 2/2004 Holmes ...................... 348/179
7,009,733 B2 * 3/2006 Gruzdev et al. .............. 358/1.9

* cited by examiner

*Primary Examiner*—Xiao M Wu
*Assistant Examiner*—Tize Ma
(74) *Attorney, Agent, or Firm*—Fenwick & West LLP

(57) ABSTRACT

White point is corrected without degrading luminance on a display device. A white point manager modifies the balance between red, green and blue according to a target white point up to a threshold gray value. As the gray scale approaches white from the threshold gray value, the white point manager blends the balance between red, green and blue from the target white point substantially towards the native white point for the display device, so as not to degrade luminance as the gray scale approaches white.

48 Claims, 4 Drawing Sheets

LUMINANCE POINT CORRECTION WITHOUT LUMINANCE DEGRADATION

CROSS REFERENCE TO RELATED APPLICATIONS

This application is a continuation of, and claims priority under 35 USC § 120 to, U.S. patent application Ser. No. 10/641,214, filed Aug. 13, 2003 now U.S. Pat. No. 6,972,772 titled "White Point Correction without Luminance Degradation," the contents of which are herein incorporated by reference.

BACKGROUND

1. Field of Invention

The present invention relates generally to display device color correction, and specifically to correcting white point without degrading luminance.

2. Background of Invention

It is often desirable to adjust the native white point of a display device to a target white point, in order to achieve an optimal display of images on the specific display device. Applications typically assume that the native white point will display correctly, and write to the display device accordingly. In practice, the display of native white is not optimal on many display devices. Therefore, it is necessary to modify the displayed white point for the device at a system level, so as to output optimal images. Prior art techniques for white point adjustment modify the balance between red, green and blue for the entire range of gray scale, from black to white. Such techniques succeed in correcting the white point from the native to the target, but have the pronounced, undesirable side effect of noticeably reducing the luminance of the display, particularly as the gray scale approaches white. By adjusting the balance to achieve the target white point, the prior art techniques lower red, green and/or blue values as the gray scale approaches white, thereby undesirably reducing the brightness of the output.

Although it is desirable to correct white point to target white, the resulting decrease in luminance in the prior art techniques is very noticeable to the users, and is thus highly undesirable. What is needed are methods, systems and computer program products for correcting white point without degrading luminance on a display device.

SUMMARY OF INVENTION

The majority of natural images (e.g., photographs, video) mostly use only the lower 95 percent of the gray scale range. By modifying the balance between red, green and blue according to the target white point for only the majority of the lower range (e.g., 95 percent) of input levels as opposed to the entire range, most images can be displayed optimally. However, the upper range of input levels requires additional special processing in order to achieve optimal display. Accordingly, the balance between red, green and blue for the remaining upper portion of the range (e.g., five percent) can be blended from the ratio for the target white point to the native white point. Thus, as input values approach the maximum range of gray scale, the output is adjusted towards native white, thereby preserving the maximum luminance. For example, suppose a display has the gray scale adjusted according to a target white point (e.g., D50) for the gray levels from 0 to a desired threshold in the upper part of the range, e.g., 242 in a system with a range of 0 to 255 (eight bits of color). The balance can then be gradually changed from D50 to native between 242 and 255, resulting in maximum output values for all three color channels at white. In other words, as input values approach 255, the output values will also approach 255 as opposed to being adjusted according to the target white point. Thus, the maximum luminance of the display will not be compromised by the white point adjustment. The transition of the red, green and blue balance can be implemented using linear interpolation or any other type of interpolation that minimizes the visual effect of the change of the white point.

Because the vast majority of natural images use on average only the lower 95 percent of the gray scale range, the images will generally be displayed according to the target white point balance, and yet luminance will not be compromised as the gray scale approaches white. The appearance of displayed images is improved according to the adjustment of the white point to target, but the user does not perceive a change in maximum brightness.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
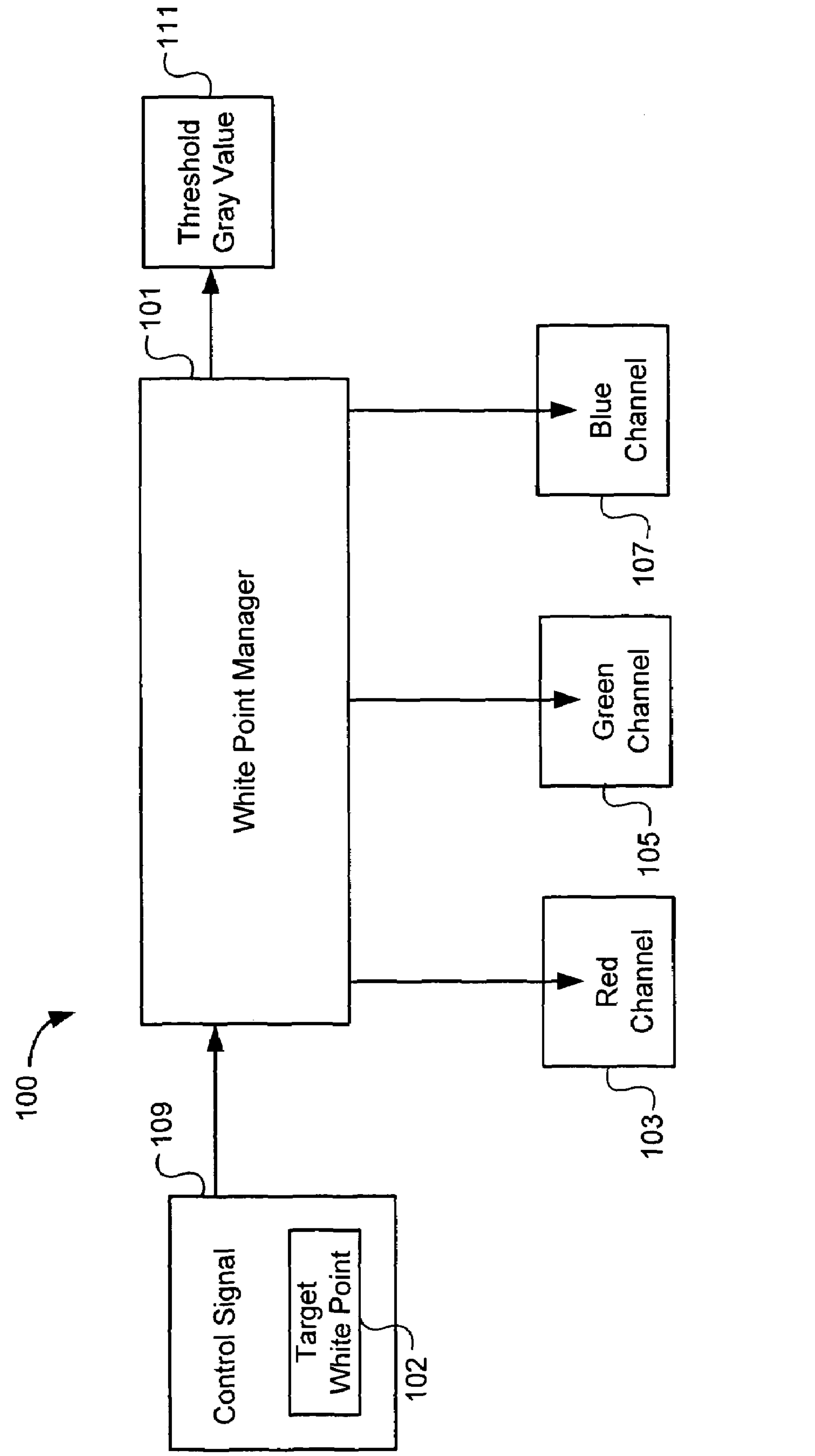
FIG. 1 is a block diagram illustrating a high level overview of a system for practicing some embodiments of the present invention.

FIG. 1 illustrates a high level overview of a system 100 for practicing some embodiments of the present invention. A white point manager 101 adjusts the red channel 103, green channel 105 and/or blue channel 107 of a display device. The implementation mechanics for adjusting color channels are known to those of ordinary skill in the relevant art. According to the present invention, the white point manager 101 modifies the balance between red 103, green 105 and blue 107 according to a target white point 102 up to a threshold gray value 111. As the gray scale approaches white from the threshold gray value 111, the white point manager 101 blends the balance between red 103, green 105 and blue 107 from the target white point 102 substantially towards the native white point for the display device, so as not to degrade luminance as the gray scale approaches white. This procedure is discussed in greater detail below.

As illustrated in FIG. 1, in some embodiments the white point manager receives a control signal 109 indicating the target white point 102 to utilize in the channel modification and blending. As will be apparent to one of ordinary skill in the relevant art in light of this specification, such a control signal 109 can originate from a variety sources. In some embodiments, a chromaticity diagram is visually displayed to a user. The user indicates the target white point 102 by visually inspecting the chromaticity diagram, and operating an input device (e.g., a pointing device or keyboard) to make adjustments. The input device then generates the control signal 109 indicating the target white point 102. In other embodiments, a visual white point indicator other than a chromaticity diagram is displayed to the user, such as a color wheel. In some embodiments, the target white point 102 is saved as a user preference, for example in a configuration file. The saved target white point can then be utilized in the future without having to be reselected or calibrated.

In other embodiments, the visual white point indicator can be measured by automatic optical calibrating hardware (not shown). Such hardware can optically measure display output (in this case the displayed chromaticity diagram) by measuring the photons emitted from the display. Such hardware can generate control signals 109 to modify the display properties (in this case, the white point adjustment).

It is to be understood that in other embodiments, the control signal 109 can be generated other ways as desired, for example by utilizing hardware and/or software to measure and modify signals internal to the computing system.

As illustrated in FIG. 1, the white point manager 101 defines a threshold gray value 111 in the upper part of the gray range. The nature and use of this threshold gray value is discussed in detail below.

It is to be understood that although the white point manager 101 is illustrated as a single entity, as the term is used herein a white point manager 101 refers to a collection of functionalities which can be implemented as software, hardware, firmware or any combination of the three. Where the white point manager 101 is implemented as software, it can be implemented as a standalone program, but can also be implemented in other ways, for example as part of a larger program, as a plurality of separate programs, or as one or more statically or dynamically linked libraries. In another embodiment of the invention, the white point manager 101 forms a computer program product and is stored on a computer-readable medium such as a storage device of the system 100.

Figure 2:
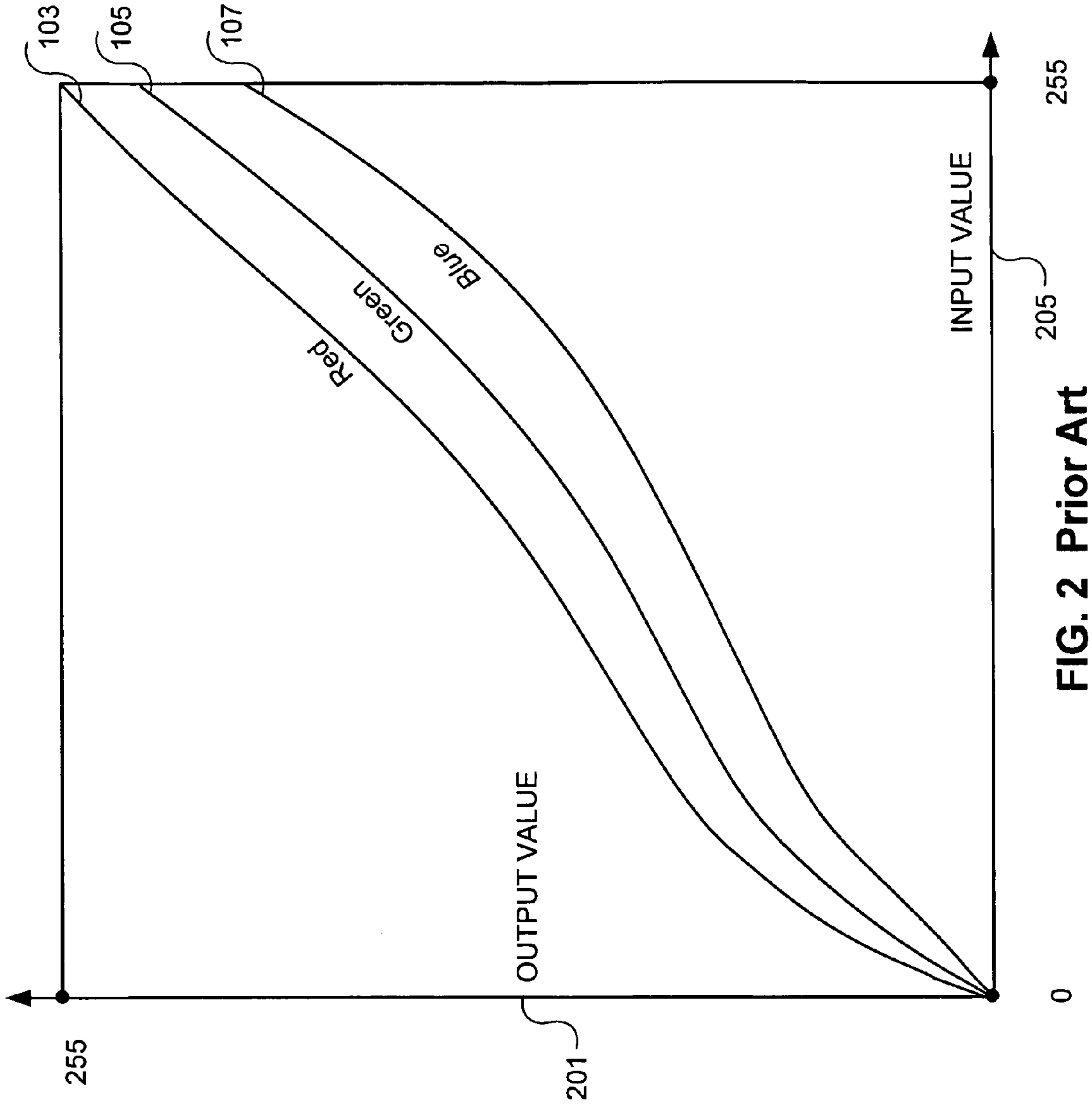
FIG. 2 Prior Art
FIG. 2 is a block diagram illustrating white point correction according to the prior art.

Before continuing the discussion of the white point manager 101 correcting the white point, it is first necessary to explain white point correction according to the prior art, which is illustrated in FIG. 2. As illustrated in FIG. 2, prior art techniques for white point adjustment modify the balance between red 103, green 105 and blue 107 for the entire range of gray scale, from black to white. The specific adjustments made will be a function of the target white point 102. In the example illustrated in FIG. 2, the modification to the balance is made by adjusting red 103 up and green 105 and blue 107 down. In other words, in order to generate the target white point, the amount of red 103 actually displayed in the output 201 is adjusted up from the amount indicated in the input 203, whereas the amounts of green 105 and blue 107 are adjusted down from the input 203 values. Of course, the specific white point correction illustrated is only an example, and those of ordinary skill in the relevant art will understand that other adjustments can be made depending upon the specific white point correction desired for the specific display device.

The prior art technique succeeds in correcting the white point from the native to the target 102, but as FIG. 2 illustrates, the technique reduces the luminance of the display. By adjusting the balance to achieve target white point 102, the red 103, green 105 and/or blue 107 values are reduced. Because displaying white according to native white point for a display typically comprises outputting maximum values for red 103, green 105 and blue 107, any adjustment thereto must be down for at least one color channel, thereby necessitating a degradation of luminance. Thus, adjusting white point according to the prior art undesirably degrades the brightness of the output 201, which is noticeable to the user, particularly as the gray scale approaches white.

Figure 3:
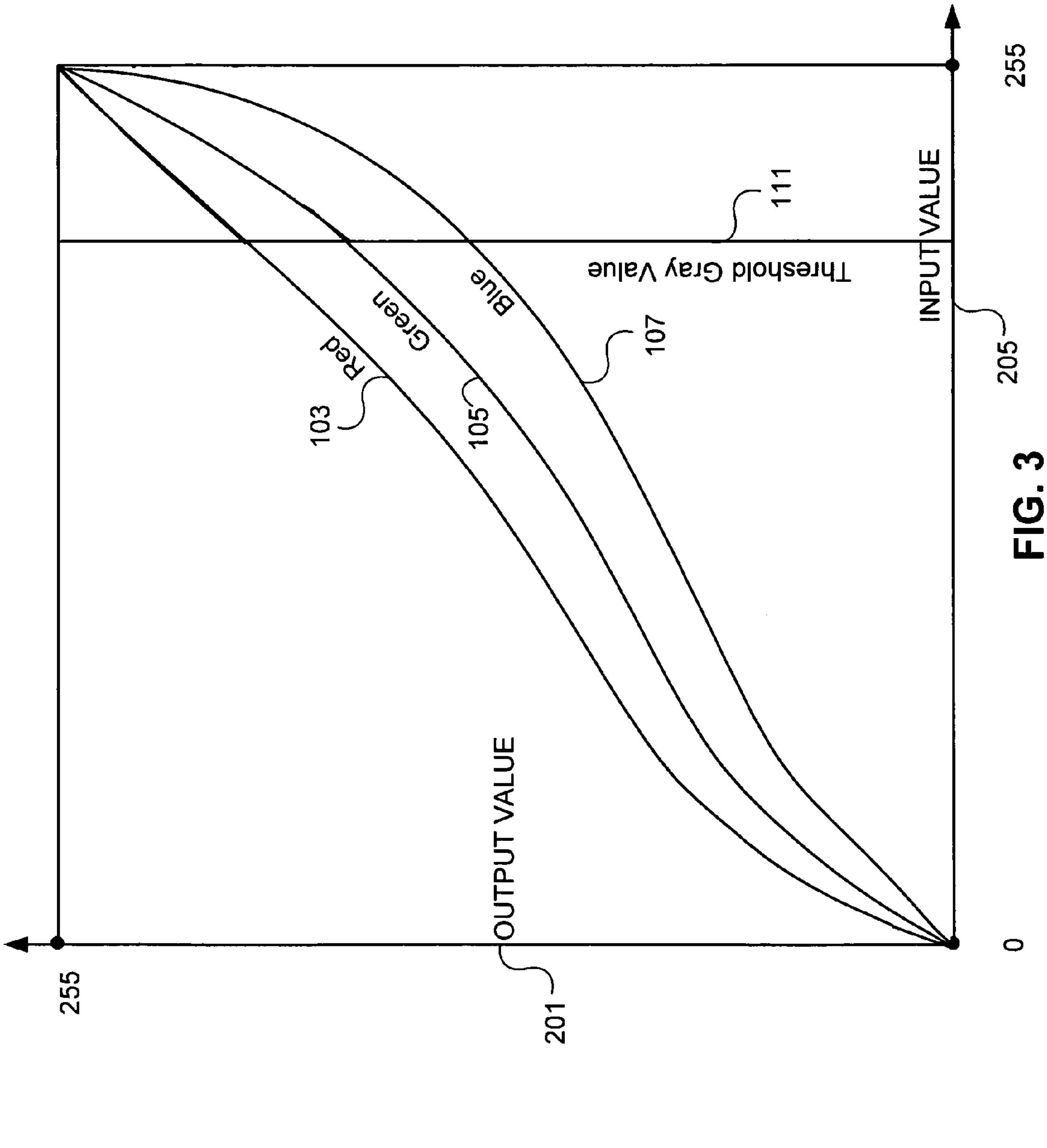
FIG. 3 is a block diagram illustrating white point correction according to some embodiments of the present invention.

FIG. 3 illustrates a technique for correcting white point without degrading luminance as the gray scale approaches white, according to some embodiments of the present invention. As mentioned above, the white point manager 101 defines a threshold gray value 111 in the upper part of the gray range. For example, in some embodiments the threshold gray value 111 is defined such that only approximately the upper five percent of the gray range is above it. To illustrate the example more specifically, in a system with a gray range of 0 to 255 (eight bits of color), the threshold gray value could be 242. The numbers 95 percent and 242 are examples only. As will be readily apparent to those of ordinary skill in the relevant art in light of this specification, in other embodiments other threshold gray values 111 can be utilized, as desired. The specific threshold gray value 111 to utilize is a design choice.

As illustrated in FIG. 3, the white point manager 101 modifies the balance between red 103, green 105 and blue 107 according to a target white point 102 up to the threshold gray value 111. However, as the gray scale approaches white from the threshold gray value 111, the white point manager 101 blends the balance between red 103, green 105 and blue 107 from the target white point 102 substantially towards the native white point for the display device, so as not to degrade luminance as the gray scale approaches white. In some embodiments, this blending from the threshold gray value 111 to white comprises interpolating red 103, green 105 and blue 107 from the threshold gray value 111 to maximum output 201. In other words, the white point manager 101 uses a smoothing function to blend the balance between red 103, green 105 and blue 107 from the target white point 102 to maximum output 201 for all three color channels. Various smoothing functions are known in the art, for example linear interpolation.

To illustrate a specific example, a Samsung display of an Apple PowerBook G4 has a native white point of D65 and a target white point 102 of D50. Assume for the sake of the example a gray scale range of 0 to 255, and a threshold gray value 111 of 242. In this example, the white point manager 101 could adjust the balance between red 103, green 105 and blue 107 from (243, 242, 210) corresponding to D50 at level 242 to (255, 255, 255) corresponding to D65 at level 255, in thirteen consecutive gray levels from 243 to 255.

As noted above, the majority of images mostly use only the lower 95 percent of the gray scale range. Therefore, by modifying the balance between red 103, green 105 and blue 107 according to the target white point 102 for the majority of the lower range of input 203 levels only, the present invention enables most images to be displayed optimally. Because the color balance for the remaining upper portion of the range is blended to maximum output 201, maximum luminance is preserved as the gray scale approaches white.

In other embodiments, the white point manager 101 interpolates red 103, green 105 and blue 107 from the threshold gray value 111 to a target value between the threshold gray value 111 and maximum output 201. Thus, the white point manager 101 still blends the balance between red 103, green 105 and blue 107 from the target white point 102 substantially towards the native white point, but in these embodiments the white point manager 101 does not blend the levels all the way to maximum output 201. The specific target value to utilize is a design choice. Because these embodiments do not blend the color balance all the way to maximum output 201, they allow some reduction in luminance in the upper gray scale range. However, these embodiments keep the white point in the upper gray range closer to target 102 than the previously described embodiments, with significantly less luminance degradation than the prior art white point correction techniques.

Figure 4:
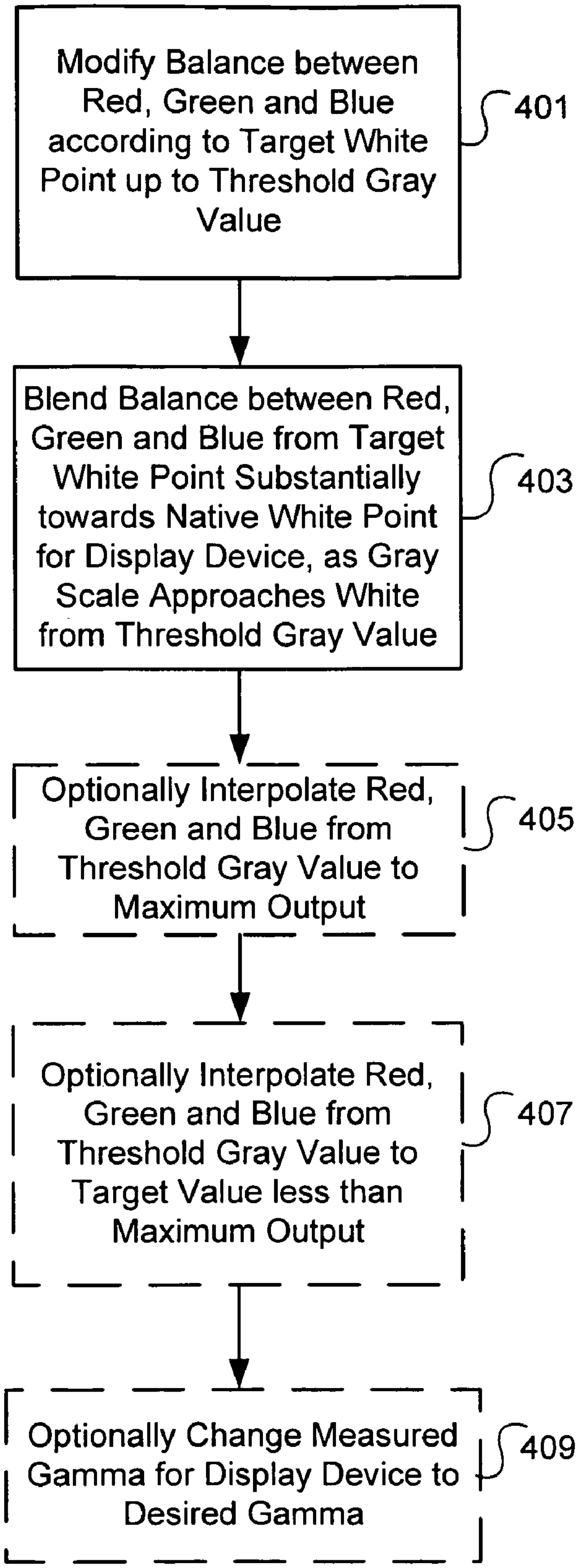
FIG. 4 is a flowchart diagram illustrating steps for correcting white point according to various embodiments of the present invention.

FIG. 4 illustrates steps for correcting white point according to various embodiments of the present invention. As explained above, in various embodiment the white point manager modifies 401 a balance between red 103, green 105 and blue 107 according to a target white point 102 up to a threshold gray value 111. The white point manager 101 blends 403 the balance between red 103, green 105 and blue 107 from the target white point 102 substantially towards the native white point for the display device, as the gray scale approaches white from the threshold gray value 111.

As explained above, in some embodiments the white point manager 101 blends 403 the balance between red 103, green 105 and blue 107 from the target white point 102 substantially towards the native white point for the display device by interpolating 405 red 103, green 105 and blue 107 from the threshold gray value 111 to maximum output 201. In other embodiments, the white point manager 101 blends 403 the balance between red 103, green 105 and blue 107 from the target white point 102 substantially towards the native white point for the display device by interpolating 407 red 103, green 105 and blue 107 from the threshold gray value 111 to a target value less than maximum output 201.

It is to be understood that white point correction according to the present invention is distinct from gamma correction for a display. As those of ordinary skill in the relevant art know, gamma correction involves altering measured gamma (contrast associated with a device's gamma curve) to equal desired gamma. It will be apparent to those of ordinary skill in the relevant art in light of this specification that white point correction according to the present invention and gamma correction can be made independently of each other. As FIG. 4 illustrates, in some embodiments of the present invention, in addition to correcting the white point as described above, measured gamma for the display device is modified 409 to a desired gamma, thereby correcting gamma for the display device. The implementation mechanics of gamma correction are known to those of ordinary skill in the relevant art.

As will be understood by those familiar with the art, the invention may be embodied in other specific forms without departing from the spirit or essential characteristics thereof. Likewise, the particular naming and division of the modules, features, attributes, managers, methodologies and other aspects are not mandatory or significant, and the mechanisms that implement the invention or its features may have different names, divisions and/or formats. Furthermore, as will be apparent to one of ordinary skill in the relevant art, the modules, features, attributes, managers, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for correcting white point without degrading luminance on a display device, the display device having a native luminance point, the method executed by a processor and comprising:

for a first set of gray values occupying a first side of a threshold gray value, modifying, by the processor, a balance among a plurality of constituent color components according to a target white point up to the threshold gray value; and for a second set of gray values occupying a second side of the threshold gray value, blending, by the processor, the balance among the plurality of constituent color components from the target white point substantially towards the native luminance point in a plurality of consecutive gray levels between the target white point to the native white point for the display device.

2. The method of claim 1 wherein blending the balance among the plurality of constituent color components further comprises:

interpolating the plurality of constituent color components from the threshold gray value to the native luminance point for the display device.

3. The method of claim 1 wherein blending the balance among the plurality of constituent color components further comprises:

interpolating the plurality of constituent color components from the threshold gray value to a target value between the threshold gray value and the native luminance point for the display device.

4. The method of claim 1 wherein the second set of gray values occupies the range from the threshold gray value to the native luminance point for the display device.

5. The method of claim 1 wherein the second set of gray values occupies the range from the threshold gray value to a target value between the threshold gray value and the native luminance point for the display device.

6. The method of claim 1 further comprising:

receiving a control signal indicating the target white point.

7. The method of claim 6 wherein receiving a control signal indicating the target white point further comprises:

receiving the control signal from one of a group of sources consisting of:

a user operated input device;

an optical display calibration device; and an internal automated display calibration mechanism.

8. The method of claim 7 further comprising:

saving the target white point as a user preference.

9. The method of claim 1 further comprising:

modifying measured gamma for the display device to a desired gamma, thereby correcting gamma for the display device.

10. The method of claim 1, wherein the native luminance point for the display device is a native white point.

11. The method of claim 1, wherein the native luminance point for the display device is a native black point.

12. A computer system for correcting white point without degrading luminance on a display device, the display device having a native luminance point, the system comprising:

logic configured to modify a balance among a plurality of constituent color components according to a target white point up to the threshold gray value, for a first set of gray values occupying a first side of a threshold gray value; and logic configured to blend the balance among the plurality of constituent color components from the target white point substantially towards the native luminance point in a plurality of consecutive gray levels between the target white point to the native white point for the display device, for a second set of gray values occupying a second side of the threshold gray value.

13. The system of claim 12 further comprising:

logic configured to interpolate the plurality of constituent color components from the threshold gray value to the native luminance point for the display device.

14. The system of claim 12 further comprising:

logic configured to interpolate the plurality of constituent color components from the threshold gray value to a target value between the threshold gray value and the native luminance point for the display device.

15. The system of claim 12 further comprising:

logic configured to receive a control signal indicating the target white point.

16. The system of claim 15 further comprising:

logic configured to save the target white point as a user preference.

17. The system of claim 12 further comprising:

logic configured to modify measured gamma for the display device to a desired gamma, thereby correcting gamma for the display device.

18. The system of claim 12, wherein the native luminance point for the display device is a native white point.

19. The system of claim 12, wherein the native luminance point for the display device is a native black point.

20. The system of claim 12, wherein the logic configured to modify a balance and the logic configured to blend the balance are hardware logic.

21. The system of claim 20, wherein the logic configured to modify a balance and the logic configured to blend the balance are components of the display device.

22. The system of claim 12, wherein the logic configured to modify a balance and the logic configured to blend the balance are software logic.

23. The system of claim 12, wherein the logic configured to modify a balance and the logic configured to blend the balance are firmware logic.

24. A computer system for correcting white point without degrading luminance on a display device, the display device having a native luminance point, the system comprising:

means for modifying a balance among a plurality of constituent color components according to a target white point up to the threshold gray value, for a first set of gray values occupying a first side of a threshold gray value; and means for blending the balance among the plurality of constituent color components from the target white point substantially towards the native luminance point in a plurality of consecutive gray levels between the target white point to the native white point for the display device, for a second set of gray values occupying a second side of the threshold gray value.

25. The system of claim 24 further comprising:

means for interpolating the plurality of constituent color components from the threshold gray value to the native luminance point for the display device.

26. The system of claim 24 further comprising:

means for interpolating the plurality of constituent color components from the threshold gray value to a target value between the threshold gray value and the native luminance point for the display device.

27. The system of claim 24 further comprising:

means for receiving a control signal indicating the target white point.

28. The system of claim 27 further comprising:

means for saving the target white point as a user preference.

29. The system of claim 24 further comprising:

means for modifying measured gamma for the display device to a desired gamma, thereby correcting gamma for the display device.

30. The system of claim 24, wherein the native luminance point for the display device is a native white point.

31. The system of claim 24, wherein the native luminance point for the display device is a native black point.

32. A computer program product for correcting white point without degrading luminance on a display device, the display device having a native luminance point, the computer program product comprising a computer-readable medium containing computer program code for:

modifying a balance among a plurality of constituent color components according to a target white point up to the threshold gray value, for a first set of gray values occupying a first side of a threshold gray value; and blending the balance among the plurality of constituent color components from the target white point substantially towards the native luminance in a plurality of consecutive gray levels between the target white point to the native white point for the display device, for a second set of gray values occupying a second side of the threshold gray value.

33. The computer program product of claim 32 further comprising:

program code for interpolating the plurality of constituent color components from the threshold gray value to the native luminance point for the display device.

34. The computer program product of claim 32 further comprising:

program code for interpolating the plurality of constituent color components from the threshold gray value to a target value between the threshold gray value and the native luminance point for the display device.

35. The computer program product of claim 32 further comprising:

program code for receiving a control signal indicating the target white point.

36. The computer program product of claim 35 further comprising:

program code for saving the target white point as a user preference.

37. The computer program product of claim 32 further comprising:

program code for modifying measured gamma for the display device to a desired gamma, thereby correcting gamma for the display device.

38. The computer program product of claim 32, wherein the native luminance point for the display device is a native white point.

39. The computer program product of claim 32, wherein the native luminance point for the display device is a native black point.

40. A method for correcting white point without degrading luminance on a display device, the display device having a native luminance point, the method executed by a processor and comprising:

determining at least one threshold gray value within a range of input values of the display device;

for at least a first set of gray values occupying a first side of the threshold gray value, modifying, by the processor, a balance among a plurality of constituent color components according to a target white point up to the threshold gray value; and for at least a second set of gray values occupying a second side of the threshold gray value, blending, by the processor, the balance among the plurality of constituent color components from the target white point substantially towards the native luminance point in a plurality of consecutive gray levels between the target white point to the native white point for the display device.

41. A method for correcting white point without degrading luminance on a display device, the display device having a native white point, the method executed by a processor and comprising:

for a first set of gray values occupying a first side of a threshold gray value, adjusting, by the computer, a balance among a plurality of constituent color components according to a target white point up to the threshold gray value; and for a second set of gray values occupying a second side of the threshold gray value, using a smoothing function to blend the balance among the plurality of constituent color components from the target white point to maximum output value in a plurality of consecutive gray levels between the target white point to the maximum output value to preserve maximum luminance for the display device.

42. The method of claim 41, wherein the smoothing function is linear interpolation.

43. The method of claim 41, wherein blending the balance among the plurality of constituent color components further comprises:

interpolating the plurality of constituent color components from the threshold gray value to a target value without blending the gray levels all the way to maximum output value.

44. A system for correcting white point without degrading luminance on a display device, the display device having a native white point, the system comprising:

a processor;

a white point manager configured by the processor to adjust a balance among a plurality of constituent color components according to a target white point up to a threshold gray value, for a first set of gray values occupying a first side of the threshold gray value; and the white point manager further configured by the processor to blend the balance among the plurality of constituent color components from the target white point to maximum output value in a plurality of consecutive gray levels between the target white point to the maximum output value to preserve maximum luminance for the display device, for a second set of gray values occupying a second side of the threshold gray value.

45. The system of claim 44 wherein the smoothing function is linear interpolation.

46. The system of claim 44, wherein the white point manager is further configured to:

interpolate the plurality of constituent color components from the threshold gray value to a target value without blending the gray levels all the way to maximum output value.

47. A computer program product for correcting white point without degrading luminance on a display device, the display device having a native white point, the computer program product comprising a computer-readable medium containing computer program code for:

adjusting a balance among a plurality of constituent color components according to a target white point up to a threshold gray value, for a first set of gray values occupying a first side of the threshold gray value; and using a smoothing function to blend the balance among the plurality of constituent color components from the target white point to maximum output value in a plurality of consecutive gray levels between the target white point to the maximum output value to preserve maximum luminance for the display device, for a second set of gray values occupying a second side of the threshold gray value.

48. The computer program product of claim 47, further comprising:

program code for interpolating the plurality of constituent color components from the threshold gray value to a target value without blending the gray levels all the way to maximum output value.

* * * * *